(12) United States Patent
Nishikawa et al.

(10) Patent No.: US 7,813,127 B2
(45) Date of Patent: Oct. 12, 2010

(54) RECEIVER APPARATUS

(75) Inventors: Jun Nishikawa, Yokohama (JP); Toru Inoue, Yokohama (JP); Shinji Nishi, Yokohama (JP); Yuzo Nishinaka, Chigasaki (JP); Toru Watanabe, Yokohama (JP); Yoshiharu Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/327,847

(22) Filed: Dec. 4, 2008

(65) Prior Publication Data

US 2009/0147463 A1 Jun. 11, 2009

(30) Foreign Application Priority Data

Dec. 7, 2007 (JP) .............................. 2007-317080

(51) Int. Cl.
*H05K 7/20* (2006.01)

(52) U.S. Cl. ...................... 361/690; 361/692; 174/16.1; 454/184

(58) Field of Classification Search ........................ None
See application file for complete search history.

(56) References Cited

U.S. PATENT DOCUMENTS

| | | | | |
|---|---|---|---|---|
| 4,702,154 A | * | 10/1987 | Dodson | ....................... 454/184 |
| 5,218,514 A | * | 6/1993 | Huynh et al. | .......... 361/679.47 |
| 5,440,450 A | * | 8/1995 | Lau et al. | ..................... 361/695 |
| 5,673,029 A | * | 9/1997 | Behl et al. | .................. 340/635 |
| 5,691,883 A | * | 11/1997 | Nelson | ........................ 361/697 |
| 5,860,291 A | * | 1/1999 | Johnson et al. | ............. 62/259.2 |
| 5,886,639 A | * | 3/1999 | Behl et al. | .................. 340/635 |
| 5,956,227 A | * | 9/1999 | Kitaoka | ....................... 361/695 |
| 6,034,870 A | * | 3/2000 | Osborn et al. | ............... 361/690 |
| 7,158,380 B2 | * | 1/2007 | Green et al. | ................ 361/704 |
| 7,307,844 B2 | * | 12/2007 | Wu | ............................. 361/719 |
| 7,436,415 B2 | | 10/2008 | Takata | |
| 7,561,428 B2 | * | 7/2009 | Watanabe | ................... 361/714 |

FOREIGN PATENT DOCUMENTS

| | | |
|---|---|---|
| JP | 2003-208238 | 7/2003 |
| JP | 2005-086721 | 3/2005 |
| JP | 2006-020160 | 1/2006 |
| JP | 2006-085399 | 3/2006 |

* cited by examiner

*Primary Examiner*—Boris L Chervinsky
(74) *Attorney, Agent, or Firm*—Antonelli, Terry, Stout & Kraus, LLP.

(57) ABSTRACT

There is provided a digital broadcasting receiver apparatus in which a temperature in the area surrounding a removable HDD does not become a high temperature during an operation regardless of whether it is disposed horizontally or vertically. A component with a large heat generating quantity and a component with a small heat generating quantity are installed in respective spaces inside a case. An adapter of the removable HDD is mounted to dispose the removable HDD in a space in which a component with a small heat generating quantity is mounted, thereby preventing the temperature in the area surrounding the removable HDD from becoming a high temperature.

13 Claims, 9 Drawing Sheets

COUPLING WITH BODY SCREW HOLE

RECEIVER APPARATUS

BACKGROUND OF THE INVENTION (1) Field of the Invention

The present invention relates to a receiver apparatus which performs recording and reproduction of digital broadcasting by using a removable recording medium.

(2) Description of the Related Arts

Recently, a television receiver has been increased in screen size and decreased in thickness by using a flat panel display (FPD) such as a liquid crystal panel or a plasma display panel (PDP). In order to realize a slimmer display device, a technique that a tuner for receiving a television signal is separated from a FPD to be used as a discrete receiver apparatus (hereinafter, tuner box) is disclosed in Japanese Laid-Open Patent Publication No. 2005-086721. An apparatus (so-called recorder) for recording a television signal received through a receiver apparatus on a recording medium (e.g., hard disc recorder: HDD) is disclosed in, for example, Japanese Laid-Open Patent Publication No. 2006-85399. Hereinafter, in this specification, an apparatus such as a tuner box or a recorder is referred to as a receiver apparatus or a digital broadcasting receiver apparatus.

In the receiver apparatus described above, a processor for controlling signal processing operates at a high speed, and high heat is generated inside a case during the operation. Due to such heat generation, a temperature inside a case of a receiver apparatus is abruptly raised.

Meanwhile, as a large-capacity recording medium, used usually is a removable HDD which is attachable to or removable from an apparatus and through which video contents are transferred to home, a movable body, a mobile, and so on. The removable HDD is susceptible to heat. For example, an upper limit of an operating temperature limit of the removable HDD is 55[° C.]. Therefore, it is required to design so that the temperature does not exceed the upper limit during an operation of a digital broadcasting receiver apparatus. As a conventional cooling technique, Japanese Laid-Open Patent Publication No. 2006-85399 discloses that in an electronic apparatus having a hard disc drive (HDD) and a digital versatile disc (DVD) drive, relative positions of an exhaust fan, a power source, a HDD, and a DVD drive which are installed on a case back side are devised to thereby improve heat radiation. However, in Japanese Laid-Open Patent Publication No. 2006-85399, considerations about a unit such as the removable HDD which cannot be used at a high temperature and a processor with a highest heat generation property are not made. Further, consideration as to whether to dispose an electronic apparatus horizontally or vertically is not made.

In a home appliance such as a digital broadcasting receiver apparatus, a user may dispose vertically or horizontally, and so its arrangement method depends on home or place. However, such consideration is not made in Japanese Laid-Open Patent Publication No. 2005-086721 and Japanese Laid-Open Patent Publication No. 2006-85399.

SUMMARY OF THE INVENTION

The present invention provides a digital broadcasting receiver apparatus that prevents the temperature in the area surrounding the removable HDD from becoming a high temperature during an operation regardless of whether it is arranged horizontally or vertically.

A receiver apparatus of the present invention includes a case in which an electronic component or a mechanical component is mounted, wherein an adapter for mounting a removable hard disc drive for recording video contents is mounted in a first space inside the case, and a component with a large heat generating quantity is mounted in a second space inside the case.

In the receiver apparatus, preferably, in the second space of the case, an exhaust fan for exhausting air inside the case, an exhaust port for exhausting air exhausted by the exhaust fan, and a second intake port for inhaling cooling air into the second space inside the case are disposed, and in the first space of the case, a first intake port for inhaling cooling air into the first space is disposed, and air inhaled from the first intake port passes through the first space to enter the second space and is discharged through the exhaust port by the exhaust fan.

In a digital broadcasting receiver apparatus, preferably, in the case where the digital broadcasting receiver apparatus is horizontally disposed, when the receiver apparatus is seen from a front side, one of a left side and a right side is the first space and the other is the second space, and in the case where the digital broadcasting receiver apparatus is vertically disposed, when the digital broadcasting receiver apparatus is seen from a front side, a lower side is the first space and an upper side is the second space.

In the digital broadcasting receiver apparatus, preferably, the exhaust port and the exhaust fan are disposed on a back side of the digital broadcasting receiver apparatus, the first intake port is installed on an outer wall of a side of the digital broadcasting receiver apparatus, and the second intake port is installed on an outer wall of a side of the digital broadcasting receiver apparatus.

In the digital broadcasting receiver apparatus, preferably, the first and second intake ports are concentrically formed on parts of installed sides, respectively.

In the digital broadcasting receiver apparatus, preferably, in the case where the digital broadcasting digital broadcasting receiver apparatus is vertically disposed, an attachment portion for attaching a stand to be used is formed on a side outer wall in which the first exhaust port is installed, and in the case where the digital broadcasting receiver apparatus is vertically disposed, a space which is able to inhale air is formed between a lower portion of the case and a contact area due to the stand.

In the digital broadcasting receiver apparatus, preferably, a main microcomputer and/or a signal processing component are mounted as a component with a large heat generating quantity mounted in the second space.

In the digital broadcasting receiver apparatus, preferably, a chassis (case) which is externally exposed contacts a surface of a component with a large heat generating quantity mounted in the second space through a high heat-conductive sheet.

In the digital broadcasting receiver apparatus, preferably, a tuner is disposed in a boundary between the first space and the second space.

According to the present invention, provided is a digital broadcasting receiver apparatus which can efficiently cool the removable HDD not to exceed an operating temperature limit.

DETAILED DESCRIPTION OF THE ILLUSTRATED EMBODIMENT

Figure 1A:
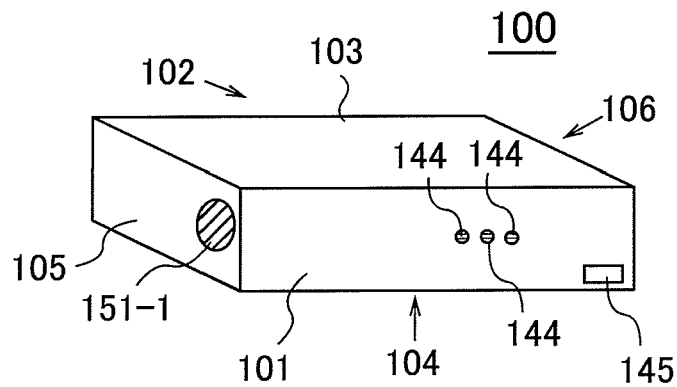
FIGS. 1A to 1C are views illustrating a configuration of a digital broadcasting receiver apparatus according to the exemplary embodiment of the present invention.

In a digital broadcasting receiver apparatus of the present invention, a component with a large heat generating quantity and a component with a small heat generating quantity are installed respective spaces inside a case, respectively. An adaptor of the removable HDD is mounted in a space in which a component with a small heat generating quantity is mounted in order to dispose the removable HDD (e.g., the removable HDD of a cartridge type) which is attachable to or removable from an apparatus as a large-capacity recording medium and through which video contents are transferred to home, a movable body, a mobile, and so on, so that even though the removable HDD is mounted, the temperature in the area surrounding the removable HDD is not raised.

Preferably, an exhaust fan is installed to exhaust air in a space in which a component with a large heat generating quantity is mounted, thereby preventing air of a high temperature from flowing to a space in which the removable HDD is mounted.

Preferably, when a digital broadcasting receiver apparatus is horizontally installed, an adaptor of the removable HDD and a component with a small heat generating quantity are disposed in a space of a left side or a right side based on a front side, and a component with a large heat generating quantity is disposed in a space of an opposite side, so that air of a high temperature does not flow into a space in which the removable HDD is mounted even in a vertical arrangement state.

More preferably, an intake port for inhaling cooling air is formed at a location adjacent to a front side of a side so that cooling air can efficiently flow to a fan from a space in which a circuit substrate having a component with a large heat generating quantity is disposed and a space in which the removable HDD is disposed.

Preferably, when a digital broadcasting receiver apparatus is in a vertical arrangement state, a stand portion is attached to a side corresponding to a space in which the removable HDD is mounted. When vertically disposed, a space in which the removable HDD is mounted is formed at a lower side, and a space in which a component with a large heat generating quantity is mounted is formed at an upper side, so that air of a high temperature does not flow into a space in which the removable HDD is mounted.

Preferably, when a digital broadcasting receiver apparatus is in a vertical arrangement state, a stand portion is attached to a side corresponding to a space in which the removable HDD is mounted. When vertically disposed, a space in which the removable HDD is mounted is formed at a lower side, and an exhaust fan is disposed at an upper side.

Preferably, when a digital broadcasting receiver apparatus is in a horizontal arrangement state, a component having a small heat generating quantity is mounted in a space (e.g., an upper side or a lower side of a space) in which the removable HDD is mounted, thereby preventing the removable HDD which is susceptible to heat from becoming a high temperature.

A chassis (case) which is externally exposed contacts a surface of a component with a large heat generating quantity such as signal processing unit, for example, a main microcomputer and a decoder, via a high heat-conductive sheet, thereby improving a cooling performance.

Hereinafter, exemplary embodiments of the present invention will be described in detail with reference to attached drawings. In the drawings, like reference numerals denote like parts, and thus duplicated description will not be repeated.

Figure 1B:
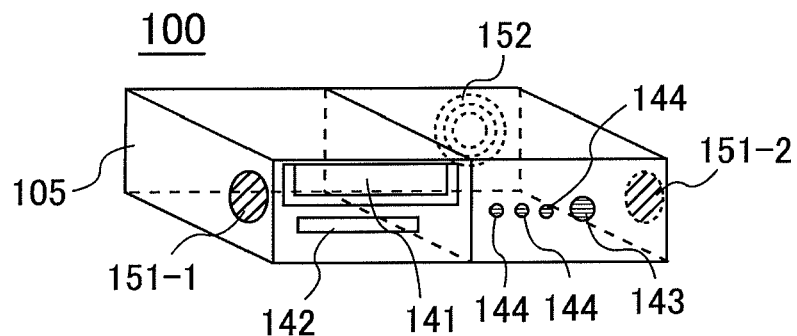
Figure 1C:
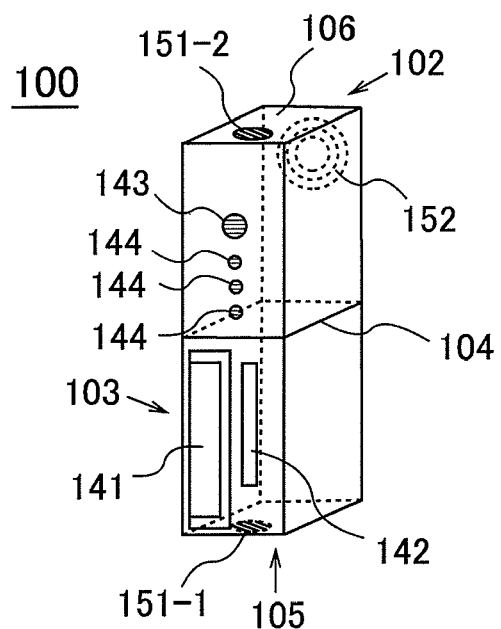

A digital broadcasting receiver apparatus according to one exemplary embodiment of the present invention will be described with reference to FIGS. 1A to 1C. FIGS. 1A to 1C are views illustrating a configuration of the digital broadcasting receiver apparatus according to one exemplary embodiment of the present invention. 100 denotes a digital broadcasting receiver apparatus, 101 denotes a front side of the digital broadcasting receiver apparatus 100, 102 denotes a back side of the digital broadcasting receiver apparatus 100, 103 denotes a top side of the digital broadcasting receiver apparatus 100, 104 denotes a bottom side of the digital broadcasting receiver apparatus 100, 105 denotes a left side of the digital broadcasting receiver apparatus 100, 106 denotes a right side of the digital broadcasting receiver apparatus 100, 141 denotes a slot of the removable HDD formed in the front side 101, 142 denotes a slot of a BS-conditional access system (B-CAS) formed in the front side 101, 143 denotes an ON/OFF button switch, 144 denotes a light emitting diode (LED) representing a state of the digital broadcasting receiver apparatus 100, 145 denotes a remote controller light receiving unit which receives a light signal of a remote controller, 151-1 denotes an intake port formed in the left side 105, 151-2 denotes an intake portion formed in the right side 105, and 152 denotes an exhaust port formed to discharge air exhausted by an exhaust fan installed in the right side 106 of the back side 102.

FIG. 1A is a perspective view illustrating an appearance of the digital broadcasting receiver apparatus 100, wherein the digital broadcasting receiver apparatus 100 is in a horizontal arrangement state. FIG. 1B is a view illustrating an appearance of the front side in the same way as FIG. 1A when a cover for covering the front side 101 is removed, and the exhaust port 152 formed in the back side 102 and the intake port 151-2 formed in the right side 106 when the front side 101 and the top side 103 are assumed to be transparent. FIG. 1C is a view drawn in the same method as FIG. 1B, wherein the digital broadcasting receiver apparatus 100 is vertically disposed. In the case of a vertical arrangement, the bottom side functions as the left side 104, and the top side functions as the right side 106. Here, "horizontal arrangement" means an arrangement method that the bottom side 104 is disposed opposite to a plane such that a table, a desk and a floor, that is, the bottom side 104 is used as an installation surface. Also, "vertical arrangement" means an arrangement method that the left side 105 is disposed opposite to a plane such that a table, a desk and a floor, that is, the left side 105 is used as an installation surface. Even though not shown in the drawing, a decorative sheet made of resin is mounted on the top side 103, the bottom side 104, the left side 105, and the right side 106 of the case, respectively, to improve a design.

In FIGS. 1A to 1C, the digital broadcasting receiver apparatus 100 which is horizontally or vertically disposed has a structure that is divided into a left space in which the removable HDD is installed and a right space in which an exhaust fan is installed.

In the back side 102 of the digital broadcasting receiver apparatus 100, even though not shown in the drawing, in addition to the exhaust port 152, various input/output terminals necessary for connecting with external apparatuses and an adapter terminal for supplying electrical power from an AC adapter are installed, and an air intake port or air exhaust port (inlet and outlet) except the exhaust port 152 are not formed. An air inlet and an air outlet are not formed in the front side 101, the top side 103, and the bottom side 104. An air intake port or air exhaust port except the intake ports 151-1 and 151-2 are not formed in the left side 105 and the right side 106.

Therefore, in the case of a horizontal arrangement like FIG. 1B, air inside the case of the digital broadcasting receiver apparatus 100 is forcibly ejected from the exhaust port 152 by an exhaust fan. Therefore, air flows into the case of the digital broadcasting receiver apparatus 100 from the intake port 151-1 in the left side 105 and the intake port 151-2 in the right side 106.

In FIGS. 1A to 1C, the intake ports 151-1 and 151-2 and the exhaust port 152 are indicated by oblique lines, but they actually include plural small holes. The intake port 151-1 in the left side 105 and the intake port 151-2 in the right side 106 are formed at locations of the installed sides (the left side 105 and the right side 106) which are far from the exhaust port 152, respectively.

Heat generated inside the case of the digital broadcasting receiver apparatus 100 is discharged such that air inside the case is ejected from the exhaust port 152, and cold air flows into the case from the intake ports 151-1 and 151-2 to thereby cool down components. In FIG. 1B, components with a large heat generating quantity such as a video processing component, for example, a decoder or a main microcomputer, are mounted in a right space (space L). Since components which should not become a high temperature are mounted in a left space (space H), it is required to prevent heat generated in the right space from flowing into the left space. However, since hot air inside the case is externally ejected forcibly by an exhaust fan of a back side of the right space, hot air does not flow into the left space. Also, a component of the relatively high height such as a tuner is mounted in a boundary between the right space and the left space, which will be described later, whereby hot air generated in the right space does not flow to the left space.

In FIG. 1C, since hot air is light in weight and moves upwardly, cooling efficiency is more improved.

Figure 2:
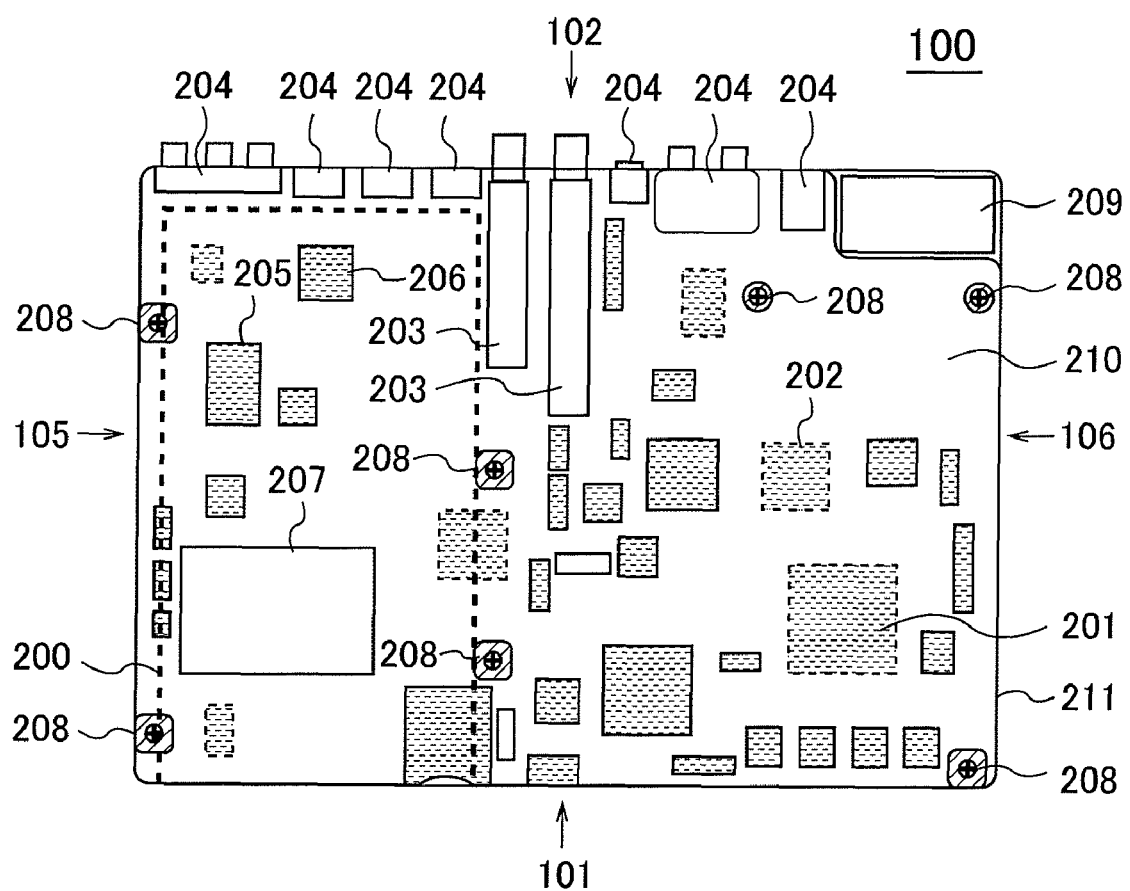
FIG. 2 is a view schematically illustrating an arrangement of components inside a case of the digital broadcasting receiver apparatus according to the present invention.

Next, an arrangement of components in the case of the digital broadcasting receiver apparatus according to one exemplary embodiment of the present invention will be schematically described with reference to FIG. 2. FIG. 2 is a view schematically illustrating an arrangement of components in the case of the digital broadcasting receiver apparatus according to one exemplary embodiment of the present invention. FIGS. 1A and 1B are views which are seen from top (the top side 103) to bottom (the bottom side 104) in the digital broadcasting receiver apparatus which is horizontally disposed, wherein the top side 103 of the case is removed. 200 denotes an adapter of the removable HDD, 201 denotes a main microcomputer. 202 denotes a decoder. 203 denotes a tuner. 204 L, denotes terminals for connecting with external apparatuses or for supplying electrical power, 205 denotes a sub microcomputer, 206 denotes a transmitter, 207 denotes a B-CAS processing unit, 208 denotes an apparatus assembly screw hole, 209 denotes an exhaust fan, 210 denotes a substrate, and 211 denotes an outer wall of the case. In addition, quadrate portions indicated by dots denote components mounted on the substrate 210, and quadrate portions having a broken line edge denote components mounted on an opposite surface (the bottom side 104) of the substrate 210.

The substrate 210 is a glass epoxy multi-layer wiring substrate, and even though other components as well as components shown in the drawing are mounted but are omitted due to complication. The substrate 210 is a main substrate, and a wiring substrate may be additionally mounted.

In the inside of the case of the digital broadcasting receiver apparatus 100 of FIG. 2, the substrate 210 is mounted almost parallel to the top side 103 and the bottom side 104 (almost parallel to an installation surface), and components with a large heat generating quantity such as a video signal processing unit, for example, the main microcomputer 201 or the decoder 202, are mounted on a right side 106 portion of the substrate 210. Meanwhile, component with a small heat generating quantity such as the sub microcomputer 205, the transmitter 206 and the B-CAS processing unit 207 are mounted in a space that the adapter 200 of the removable HDD is mounted, that is, on a left side 105 portion of the substrate 210.

The main microcomputer 201 operates to control the removable HDD, the decoder 202, and the tuner 203 during a normal operation of the digital broadcasting receiver apparatus 100 and has the highest heat generating quantity among various components mounted in the digital broadcasting receiver apparatus 100. Here, the normal operation means a state which the digital broadcasting receiver apparatus 100 is able to receive a digital broadcasting, demodulate and decodes the received signal, perform other signal processing, and record it onto or read it from the removable HDD. The decoder 202 decodes a received digital broadcasting signal and has the same heat generating quantity as the main microcomputer 201. As described above, in one exemplary embodiment of the present invention, the main microcomputer and/or the decoder which have a large heat generating quantity during a normal operation are mounted in the right space. Here, the main microcomputer 201 and the decoder 202 may be formed integrally (in a single chip form).

The sub microcomputer 205 is in a state which can respond to a command from a remote controller when the digital broadcasting receiver apparatus 100 is in a standby state, that is, in a standby operation that main power is turned off, and operates to turn on electrical power of the digital broadcasting receiver apparatus 100 in response to a power ON command from a remote controller. The sub microcomputer 205 is low in heat generating quantity compared to the main microcomputer 201 and its heat generating quantity does not or rarely influence an operation of the removable HDD, and thus it is mounted on the right side 105 portion of the substrate 210 on which the adapter 200 of the removable HDD is disposed. The B-CAS processing unit 207 also has a small heat generating quantity, and thus it is mounted on the right side 105 portion. Of course, besides the sub microcomputer 205 and the B-CAS processing unit 207, other components may be mounted on the right side 105 portion. A component that the operating temperature does not exceed 55[° C.] which is an upper limit of the operating temperature limit of the removable HDD can be mounted on the right side 105 portion.

Figure 3:
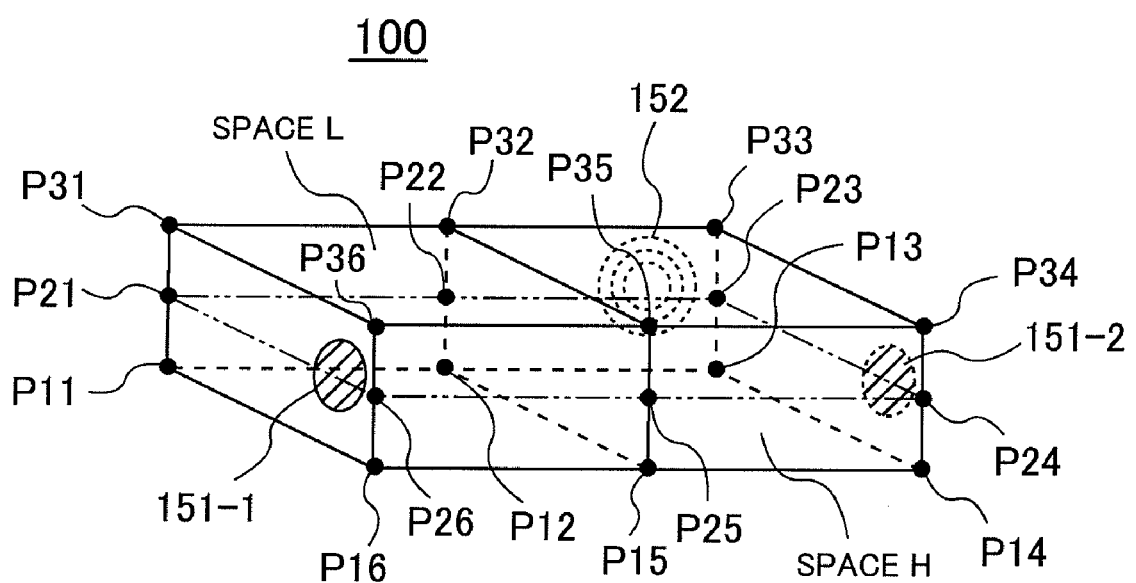
FIG. 3 is a view illustrating an arrangement of a removable HDD according to the exemplary embodiment of the present invention.

The arrangement of FIG. 2 will be described by using a general spatial concept with reference to FIG. 3. FIG. 3 is a view illustrating an arrangement of the removable HDD according to one exemplary embodiment of the present invention. The digital broadcasting receiver apparatus 100 of FIG. 2 has six sides surrounded by a case and has the intake ports 151-1 and 151-2 and the exhaust port 152 as an air passage.

In FIG. 3, the digital broadcasting receiver apparatus 100 is represented by a rectangular parallelepiped defined by 8 points P31, P33, P34, P36, P11, P13, P14, and P16 and is divided into two spaces L and H by a plane defined by points P32, P35, P15, and P12. In FIGS. 1A to 2, the space L is a space in which the adapter 200 of the removable HDD is mounted, and the space H is a space having a substrate area on which the exhaust fan 209 and components with a large heat generating quantity (e.g., components 201 and 202) are mounted.

The space L and the space H are divided into two spaces, respectively. That is, the space L is divided into upper and lower sections (which are referred to as a space L upper section and a space L lower section, respectively) by a plane defined by points P21, P22, P25, and P26, and the space H is divided into upper and lower sections ((which are referred to as a space H upper section and a space H lower section, respectively) by a plane defined by points P22, P23, P24, and P25.

The adapter 200 of the removable HDD which is a component susceptible to heat is disposed in the space L upper section (rectangular parallelepiped defined by points P31, P32, P35, P36, P21, P22, P25, and P26), components which do not generate much heat (for example, the sub microcomputer 205 which is on standby when electrical power is in an OFF state, the transmitter 206, and the B-CAS processing unit) are disposed in the space L lower section (rectangular parallelepiped defined by points P11, P12, P15, P16, P21, P22, P25, and P26), thereby preventing the adapter 200 of the removable HDD which is a component susceptible to heat from becoming a high temperature.

That is, in one exemplary embodiment of the present invention, in the space L, the adapter 200 into which the removable HDD is inserted is disposed, and the sub microcomputer 205 or the B-CAS processing unit 207 which has a small heat generating quantity is mounted on a portion of the substrate 210 below the adapter. Therefore, the removable HDD is thermally protected, and an integration degree of various components on the substrate 210 is increased to thereby make the digital broadcasting receiver apparatus more compact.

Figure 9A:
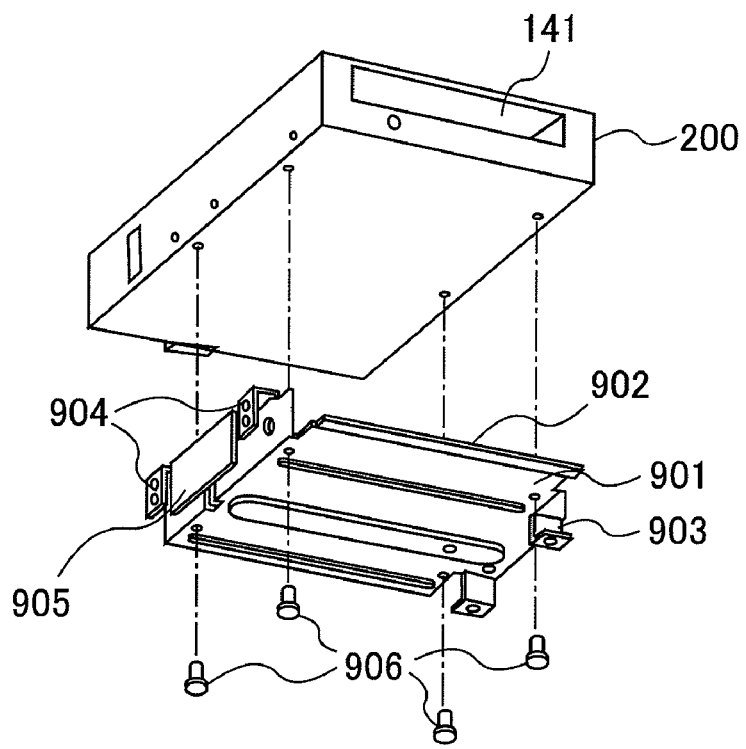
FIGS. 9A to 9C are views illustrating an attachment form of an adapter of a removable HDD and a receiver apparatus case.
Figure 9B:
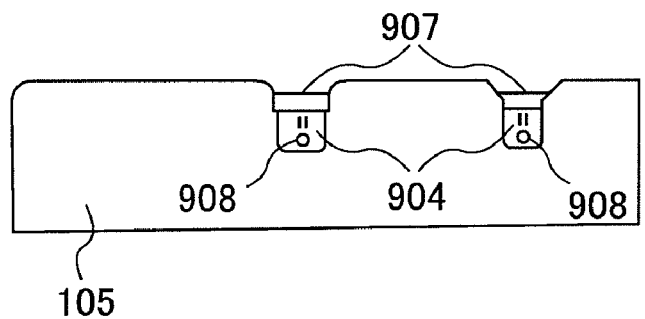
Figure 9C:
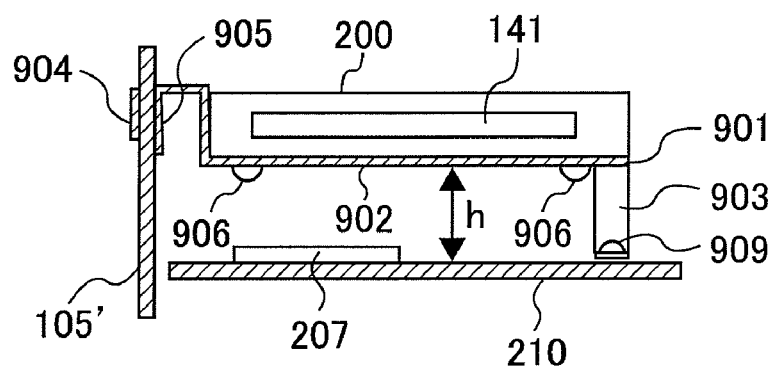

The adapter 200 of the removable HDD is coupled with the case and the substrate 210 to form a predetermined space between the adapter 200 and the substrate 210, which is shown in FIGS. 9A to 9C. FIG. 9A shows a relationship between the adapter 200 of the removable HDD and a metal fitting 901 as a coupling member for coupling the adapter 200 with the case 211 and the left side plate 105 of the case. The metal fitting 901 has a plane section 902, and the adapter 200 is placed on the plane section 902. The metal fitting 901 is coupled with the adapter 200 by four screws 906. Also, the metal fitting 901 includes a support section 903 of which a shape seen from the side of the adapter 200 is a letter "L", and a first pinching section 904 and a second pinching section 905 which pinch a left side plate 105' of the case. When the first pinching sections 904 and the second pinching section 905 are seen from a slot 141 side of the adapter 200, a gap for pinching the left side plate 105' is formed between the first pinching section 904 and the second pinching section 905. FIG. 9B is a view which the metal fitting 901 attached to the left side plate 105' of the case is seen from the left side 105 of the case. As shown in FIG. 9B, notches 907 are formed in portions of the left side plate 105', respectively, corresponding to the two first pinching sections 904 of the metal fitting 901. The first pinching sections 904 are inserted in the notches 907 and are slid down. Then, the first pinching sections 904 are fixed to the left side plate 105' by screws 908. At this time, the first pinching section 904 and the second pinch section 905 sandwich the left side plate 105' as shown in FIG. 9C. Also, the support section 903 of the metal fitting 901 is screw-fixed to and coupled with the substrate 210 by a screw 909.

Here, the height of the metal fitting 901, that is, a dimension of a direction perpendicular to a surface of the substrate 210, is within a range of, for example, 10 mm to 20 mm. Therefore, as shown in FIG. 9C, a space of the height h defined by the metal fitting 901 is formed between the adapter 200 and the substrate 210. In this space, a component with a small heat generating quantity, for example, the B-CAS processing unit 207 is mounted on the substrate 210. Also, as described above, the outer surface of the left side plate 105' of the case is covered and coated with a decorative sheet, and thus the notch 907 and the first pinching section 904 are not externally shown.

In the space H which becomes a high temperature, a mounting substrate is disposed below the space H (rectangular parallelepiped defined by points P12, P13, P14, P15, P22, P23, P24, and P25), and a space in which a built-in HDD can be disposed is formed above the space H (rectangular parallelepiped defined by points P32, P33, P34, P35, P22, P23, P24, and P25).

A component with the relative high height, for example, the tuner 203, is mounted in a boundary between the spaces L and H, so that a wall between the spaces L and H which functions as a protective wall for preventing hot air of the space H from flowing in to the space L is formed.

According to one exemplary embodiment of the present invention shown in FIGS. 1A to 3, the digital broadcasting receiver apparatus is divided into two spaces. Components with a large heat generating quantity such as the main microcomputer or the decoder and components susceptible to heat such as the removable HDD are mounted in different spaces from each other. Also, the fan 209 for forcibly discharging air of high temperature is installed on the case outer wall of the space in which components with a large heat generating quantity are mounted, and the intake port for inhaling external cold air is installed on the case outer wall of each space, thereby realizing the digital broadcasting receiver apparatus which has excellent cooling efficiency regardless of whether it is disposed horizontally or vertically.

A digital broadcasting receiver apparatus according to another exemplary embodiment of the present invention will be described below with reference to FIGS. 7 and 8.

Figure 7:
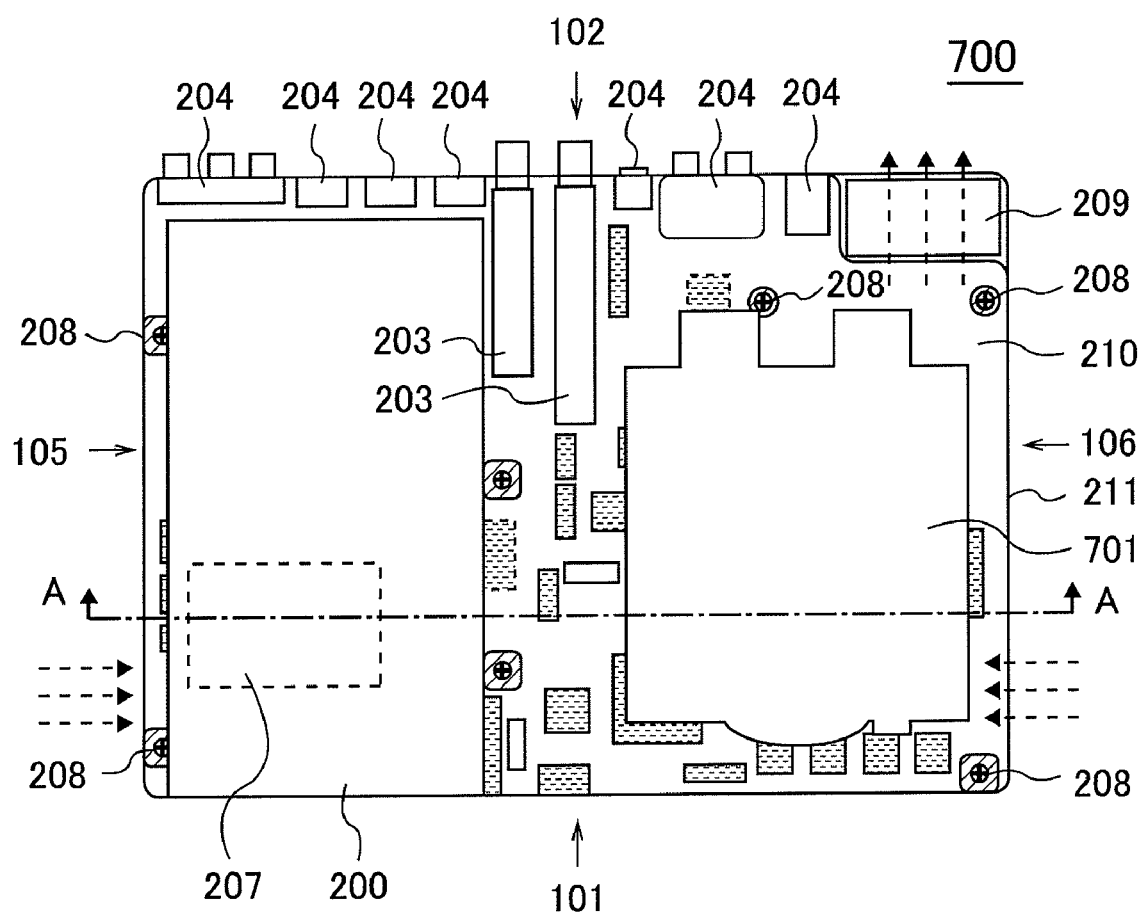
FIG. 7 is a view illustrating an arrangement of components inside a case of the digital broadcasting receiver apparatus according to the present invention.
Figure 8:
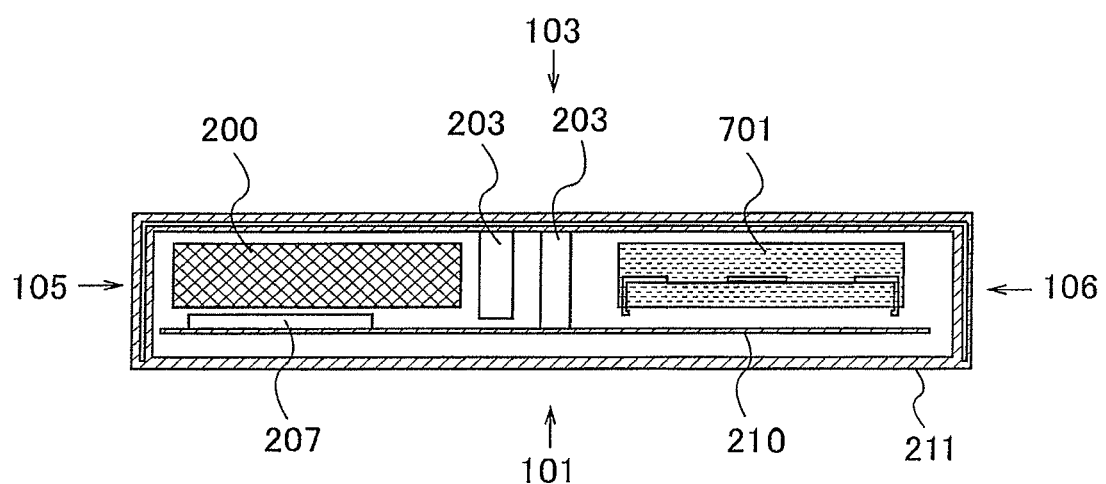
FIG. 8 is a view illustrating an arrangement of components inside a case of the digital broadcasting receiver apparatus according to the present invention.

FIGS. 7 and 8 show the digital broadcasting receiver apparatus with a built-in HDD according to another exemplary embodiment of the present invention. 701 denotes a built-in HDD, and FIG. 7 is a view which is seen from the top side 103 (plane view that the top cover is transmitted). FIG. 8 is a schematic diagram taken along line A-A of FIG. 7.

In FIG. 7, the B-CAS processing unit 207 is disposed below the adapter 200 of the removable HDD and thus is not shown, but it is indicated by a broken line for reference.

In the substrate 210, the adapter 200 of the removable HDD, and the built-in HDD 701, a connecting or support metal fitting or a spacer except a screw is not shown.

A DC voltage of 5[V] is supplied to the removable HDD, and a DC voltage of 12[V]/5[V] is supplied to the built-in HDD 701. Therefore, the built-in HDD 701 is high in power consumption and in a heat generating quantity compared to the removable HDD. For this reason, in another exemplary embodiment of the present invention, the built-in HDD 701 is disposed in the space H in which the exhaust fan 209 is disposed. As a result, since heat generated in the built-in HDD is guided to the exhaust fan 209, heat transferred from the built-in HDD to the removable HDD can be decreased. If the digital broadcasting receiver apparatus is vertically disposed, the removable HDD with a small heat generating quantity is disposed at a lower side, and the built-in HDD with a large heat generating quantity is disposed at an upper site, thereby safely protecting the removable HDD from heat generated in the built-in HDD. Also, since the built-in HDD 701 is high in upper limit of the operating temperature limit, and thus it can operate without any problem even though it is disposed in the space H in which a component with a large heat generating quantity is disposed.

As can be seen in FIGS. 7 and 8, the adapter 200 of the removable HDD or the built-in HDD 701 is large in size, and the inside has a structure that cooling air does not flow. Therefore, cooling air flows along the outer wall of such a structure, and heat is absorbed from them and is externally discharged. In another exemplary embodiment of the present invention, like one exemplary embodiment of FIGS. 1A to 3, an intake port is formed in the space L in which components which have a small heat generating quantity and is susceptible to heat are mounted and in the space H in which components which have a large heat generating quantity and generate heat, respectively, and an exhaust fan and an exhaust port are formed in an opposite side to the intake port in the space H that a heat generating quantity is large. As a result, heat generated in the space H does not flow into the space L but is externally immediately exhausted. Heat generated in the space L passes through the space H before exhausted, but since the temperature of air which passes through the space H from the space L is lower than the temperature of the space H, air from the space L help cool down the space H. Therefore, in a configuration of the digital broadcasting receiver apparatus according to another exemplary embodiment of the present invention, a heat quantity generated inside the case can be efficiently exhausted, whereby the temperature of the removable HDD does not exceed the operating temperature limit.

In one exemplary embodiment of FIGS. 1A to 3, in the case of a horizontal arrangement, the left side 105 is the space L in which components that an upper limit of the operating temperature limit is low are mounted, and the right side 106 is the space H in which components with a large heat generating quantity are mounted. However, it is obvious that the left side 105 functions as the space H and the right side 106 functions as the space L. In this instance, in the case of a vertical arrangement, a stand is installed such that the right side 106 which is the space L is an upper side and the left side 105 which is the space H is a lower side.

Also, in the case where an electrical component or a mechanical component is mounted in the case, since a screw fixing hole, a support hole or a inserting hole has to be formed in the case, efficiently keeping out the case is impossible. Therefore, as can be seen in FIG. 8, an outer wall for more sealing the case up is formed on an outer surface of the case to define an intake port and an exhaust port. Due to such an outer wall effect, even though an opening based on a mechanical dimension difference or a minute opening necessary in design exist to a certain extent, it does not greatly influence a cooling air passage.

Figure 4A:
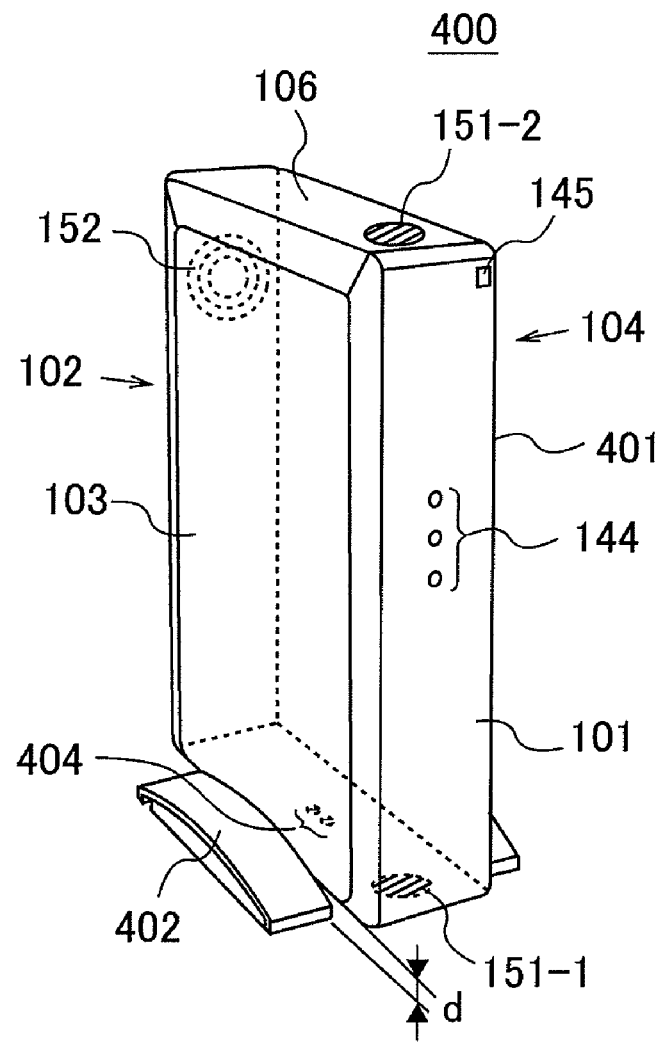
FIGS. 4A and 4B are perspective views illustrating an appearance of the digital broadcasting receiver apparatus according to the exemplary embodiment of the present invention.
Figure 4B:
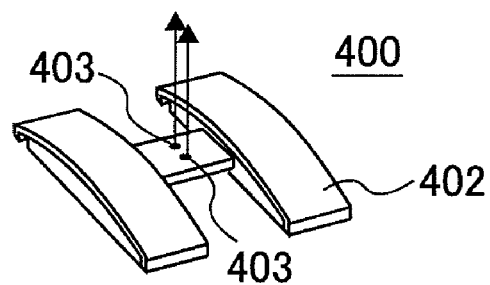

Next, a configuration that the left side 105 (see FIG. 1C) functions as an installation surface and the right side 106 functions as an upper side when the digital broadcasting receiver apparatus is vertically disposed will be described with reference to FIGS. 4A and 4B. FIGS. 4A and 4B are perspective views illustrating an appearance of the digital broadcasting receiver apparatus according to the exemplary embodiment of the present invention. 400 denotes the digital broadcasting receiver, 401 denotes a body of the digital broadcasting receiver 400, 402 denotes a stand of the digital broadcasting receiver apparatus 400, 403 denotes a screw hole of the stand 402, and 404 denotes a screw fixing portion for screw-fixing the body 401 and the stand 402.

FIG. 4A is a perspective view illustrating the digital broadcasting receiver apparatus 400 that the body 401 of is attached to 402 and is vertically disposed, and FIG. 4B is a perspective view illustrating one embodiment of the stand 402.

In FIGS. 4A and 4B, the digital broadcasting receiver apparatus 400 is vertically disposed on a floor such as a desk. At this time, in the digital broadcasting receiver 400, the body 401 and the stand 402 of the digital broadcasting receiver apparatus 400 are fixed such that a screw hole formed in an outer wall of the left side 105 of the body 401 and the screw hole 403 formed in the stand 402 are screw-fixed with the screw fixing portion 404. At this time, if the left side 105 directly contacts a floor, the intake port 151-1 is clogged, so that cooling air does not flow in. In order to prevent such a phenomenon, a gap which is as high as a space d is formed.

Also, the stand 402 can be freely separated as described above. Even though the screw hole of the body 401 functions as an intake port, since it is a very small amount, it is not problematic. If a problem occurs, for example, a valve may be installed in the body to prevent air from flowing in through a screw hole even though the stand 402 is separated, leading to a blockade configuration.

Figure 5A:
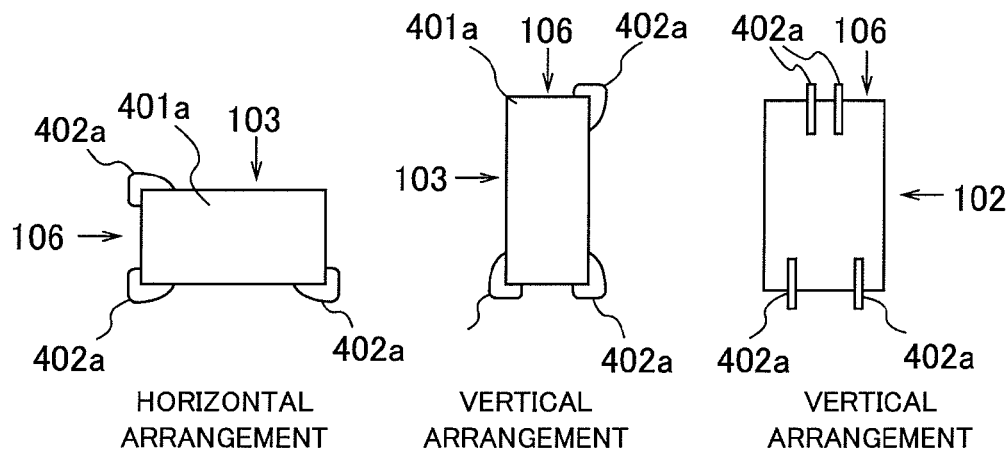
FIGS. 5A to 5C are views illustrating an appearance of the digital broadcasting receiver apparatus according to the exemplary embodiment of the present invention.
Figure 5B:
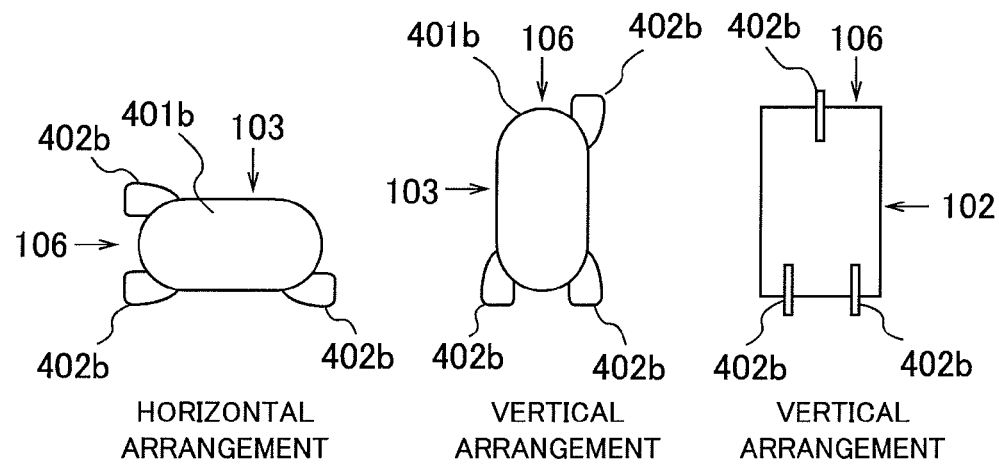
Figure 5C:
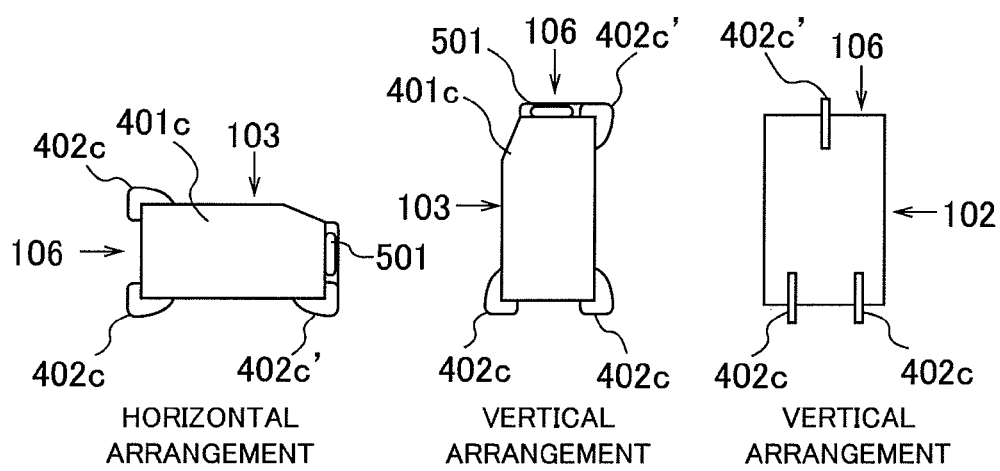

Another embodiment of the digital broadcasting receiver apparatus according to the present invention will be described with reference to FIGS. 5A to 5C. As a configuration for attaching the stand to the body of the digital broadcasting receiver apparatus like FIGS. 4A and 4B, FIGS. 5A to 5C show a horizontal arrangement configuration that the body and the stand are integrally formed or the stand is not separated. FIGS. 5A to 5C show structures of different embodiments. In each of FIGS. 5A to 5C, the left is a view seen at the front side 101 in the case of a horizontal arrangement, the center is a view seen at the front side 101 in the case of a vertical arrangement, and the right is a view seen at the right side 106 in the case of a vertical arrangement. 401a to 401c denote a body of the digital broadcasting receiver apparatus, and 402a to 402c and 402c' denote a stand unit. The other components are not shown in the drawings.

In FIG. 5A, two stand units 402a are attached to the left side 105 and the right side 106, respectively, so that it can be stationary even in a horizontal arrangement state. Also in a case of a vertical arrangement, the left side 106 is positioned to face a floor, and so a distance between the two stand units is decreased, so that two stand units are disposed close to each other, thereby preventing an unstable arrangement.

In FIG. 5B, a shape of the body which is seen at the front side 101 is elliptical, and one stand 402b is attached to the right side 106. Since the right side 106 has a rounded shape or a shape that its end is getting narrow, the right side 106 cannot be positioned to face a floor. Also, if the top side 103 is positioned to face a floor, it is inclined, and so since it is unstable, it is a structure that a user is difficult to dispose.

FIG. 5C, a handle 501 with which a user can hold the digital broadcasting receiver apparatus is formed in a stand 402' of the left side 106. Such a configuration makes it convenient to carry and prevents the left side 106 from being positioned to face a floor.

According to the embodiment of FIGS. 5A to 5C, even though separation is impossible, it is possible to horizontally dispose, and even in the case of a vertical arrangement, if the right side 106 is positioned to face a floor, an unstable configuration is provided.

Also, according to the embodiment of FIG. 5C, since it can be used as a handle, it is convenient to carry.

Figure 6:
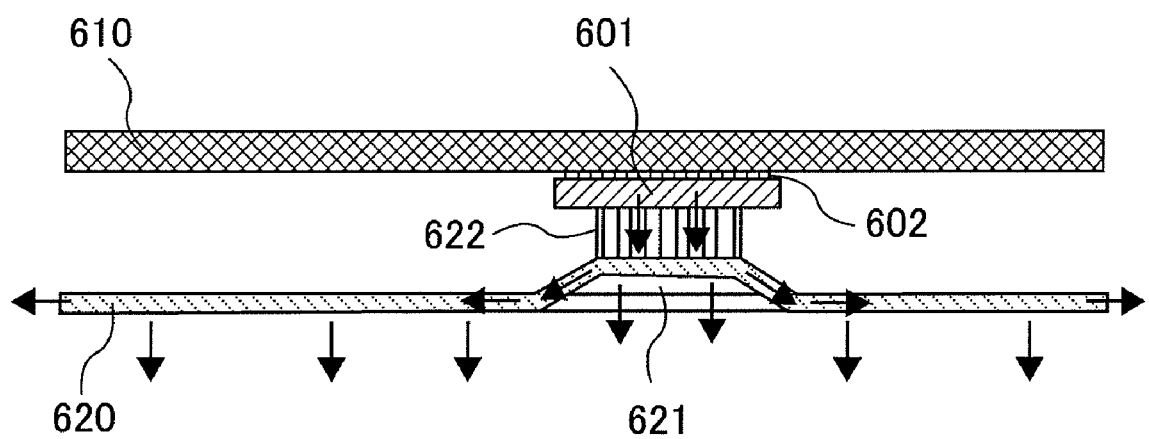
FIG. 6 is a cross-sectional view illustrating a cooling structure according to the exemplary embodiment of the present invention.

Next, another exemplary embodiment of the present invention will be described below with reference to FIG. 6. FIG. 6 is a cross sectional view illustrating a part of the case to describe a structure for improving a performance for cooling components which generate high heat in the digital broadcasting receiver apparatus of the present invention. 601 denotes a main microcomputer, 610 denotes a substrate, 620 denotes a case portion of a bottom side 104 of the digital broadcasting receiver apparatus, 621 denotes an concave portion of the case portion 620, 622 denotes a thermal conductive sheet bonded to the concave portion 621, and 602 denotes a soldering member for electrically and mechanically connecting the main microcomputer 601 to the substrate 610.

In FIG. 6, the concave portion 621 of the case portion 620 is formed at a location facing a heat generating component such as the main microcomputer 601, and the thermal conductive sheet 622 is bonded to a surface of the concave portion 621 facing the main microcomputer 601 by an adhesive agent. The main microcomputer 601 is attached to a bottom of the substrate 610 by a soldering member 602, and the main microcomputer 601 and the thermal conductive sheet are bonded to each other.

Due to such a configuration, heat generated in a heat generating component such as the main microcomputer 601 is transferred to the case portion 620 through the thermal conductive sheet 622 and is then externally radiated as indicated by an arrow in FIG. 6. A signal process such as the decoder 202 described above may be mounted on the substrate 610 in the above-described manner. Also, the main microcomputer 601 may be formed integrally with a signal processor in a single chip form.

Heat generated in a heat generating component is externally radiated even in the bottom side 104, and thus a cooling performance is improved.

In FIG. 6, the concave portion 621 is formed in the case portion 620, but a shape of the concave portion 621 is not limited to this shape. Further, without forming the concave portion 621, a conductive metal sheet may be formed to bond the thermal conductive sheet 622. Furthermore, the thermal conductive sheet 622 may be directly bonded without using the concave portion 621.

According to the exemplary embodiments of FIGS. 1A to 8, even though the digital broadcasting receiver apparatus of the present invention is horizontally or vertically disposed, generated heat can be efficiently externally exhausted, so that the temperature of components which are susceptible to heat does not rise to the operating temperature limit.

Also, since the size of the exhaust fan can be decreased, a production cost and power consumption can be reduced. Since the temperature of components which are susceptible to heat does not rise to the operating temperature limit, reliability is improved, and life span is increased.

Further, in the exemplary embodiments of the present invention, since a necessary DC voltage is supplied by using a discrete AC-DC converter without supplying AC power, power consumption and a heat generating quantity can be reduced. However, a digital broadcasting receive apparatus with a built-in AC-DC converter will be possible in the future.

What is claimed is:

1. A receiver apparatus that receives a digital broadcast signal, comprising:
    a tuner, that receives said digital broadcast signal;
    a decoder, that decodes said broadcast signal received by said tuner;
    an adaptor, connected to a removable hard disk that records a decoded signal output by said decoder;
    a control unit, that controls said removable hard disk, that is connected to said removable hard disk via said adaptor, and that has a heat generating quantity larger than that of said removable hard disk; and
    a case, wherein said case has a front side in which is formed an inserting hole for inserting said removable hard disk, a back side opposed to said front side, a left side opposed to a right side, and a top side opposed to a bottom side which are both larger than said front side, said back side, said left side, and said right side;
    an attachment portion, that enables attaching a stand for supporting said receiver apparatus when said receiver apparatus is vertically installed;
    wherein when said receiver apparatus is viewed from above said top side of said case, a first space is disposed in one portion of said case, and a second space is disposed in another portion of said case;
    wherein said adaptor, said attachment portion, and an air inlet are respectively disposed within said first space or on a side of said first space, while said decoder, said control unit, and an air outlet are respectively disposed within said second space or on a side of said second space; and
    wherein when said receiver apparatus is vertically installed using said stand, said first space is positioned below said second space.

2. The receiver apparatus according to claim 1, wherein an outlet fan that lets out air from inside said case through said air outlet is formed in said second space.

3. The receiver apparatus according to claim 1, wherein said air inlet is formed on said left side of said first space, and said air outlet is formed on the back side of said second space.

4. The receiver apparatus according to claim 3, wherein an additional air inlet is formed on said right side of said second space.

5. The receiver apparatus according to claim 1, wherein said tuner is disposed between said first space and said second space.

6. The receiver apparatus according to claim 3, wherein a sub-microcomputer operating in a stand-by state of said receiver apparatus is disposed on said bottom side of said adaptor within said second space; and
    wherein said sub-microcomputer has a heat generating quantity smaller than that of said control unit.

7. The receiver apparatus according to claim 6, wherein a card processing unit for receiving a digital broadcast is further disposed on said bottom side of said adaptor within said second space.

8. The receiver apparatus according to claim 1, wherein at least a portion of the connection between said control unit and said case comprises a high heat-conductive sheet.

9. The receiver apparatus according to claim 8, further comprising:
    a board, on which said microcomputer and said decoder are mounted;
    wherein said control unit is formed on a top side of said board, opposed to a bottom side of said board and a bottom side of said case;

wherein a concave portion is formed on said bottom side of said board; and wherein said control portion and said concave portion are connected through said high heat-conductive sheet.

10. The receiver apparatus according to claim 1, further comprising:

an additional hard disk that records a signal decoded by said decoder;

wherein said additional hard disk is formed in said second space.

11. The receiver apparatus according to claim 10, wherein said additional hard disk has a heat generating quantity larger than that of said removable hard disk; and wherein said additional hard disk is formed on said top side of said control unit and said decoder, within said second space.

12. The receiver apparatus according to claim 6, further comprising:

a board, on which said microcomputer, said decoder and said sub microcomputer are mounted; and an attachment member for attaching said adapter onto said board;

wherein said attachment member forms a space for enabling to dispose said sub-microcomputer between said board and said adapter.

13. A receiver apparatus receiving a digital broadcast signal, comprising:

a tuner that receives said digital broadcast signal;

a decoder that decodes said broadcast signal received by said tuner;

a recording unit that records said signal decoded by said decoder;

a microcomputer that controls said tuner and said control unit, and that has a heat generating quantity larger than that of said control unit; and a case, wherein said case has a front side, a back side opposing to said front side, a left side and a right side, and a top side and a bottom side which are larger than said front side, said back side, said left side, and said right side;

wherein when said receiver apparatus is viewed from above said top side of said case, a portion of said case disposed on one side of said case comprises a first space, and a portion of said case disposed on another side of said case comprises a second space;

wherein said recording unit is disposed in said first space, and said decoder and said microcomputer are disposed in said second space, an air inlet is formed on said left side and of said case, another air inlet is formed on said right side and of said case, and an air outlet is formed on a back side of said second space of said case;

wherein when said receiver apparatus is horizontally installed, a bottom side of said case is an installation side of said receiver apparatus; and wherein when said receiver apparatus is vertically installed, a side of said first space of said case is an installation side.

* * * * *